April 18, 1944.          A. R. KEISTMAN          2,347,056
ARMATURE CONSTRUCTION
Filed Jan. 6, 1943

INVENTOR.
ARNOLD R. KEISTMAN
BY
Frank N. Harmon
ATTORNEY

Patented Apr. 18, 1944

2,347,056

UNITED STATES PATENT OFFICE 2,347,056

ARMATURE CONSTRUCTION

Arnold R. Keistman, Shaker Heights, Ohio, assignor to Jack & Heintz, Inc., Bedford, Ohio, a corporation of Ohio Application January 6, 1943, Serial No. 471,417

3 Claims. (Cl. 171—321)

This invention relates to an armature having an improved commutator construction.

As the trend continues toward ever increasing speeds in electrical machines, conventional commutator construction imposes a rather definite limit on rotational speeds which cannot be exceeded without changing the design. In view of the size and weight limitations in aircraft equipment particularly, it is desirable to operate electrical machines such as generators, starters and other motors at extremely high speeds in order to obtain high power ratings with relatively small machines in comparison with existing conventional standards. It is therefore an object of the present invention to provide a novel and improved commutator construction capable of higher rotational speeds than conventional commutators. A further object is to provide an improved commutator bar having material removed therefrom in such a manner as to reduce the weight thereof without sacrificing the strength required to withstand high orders of centrifugal force. A still further object is to provide a commutator bar having the structural characteristics of a bridge truss.

The invention is best understood with reference to the accompanying drawing illustrating a preferred embodiment:

Figure 1:
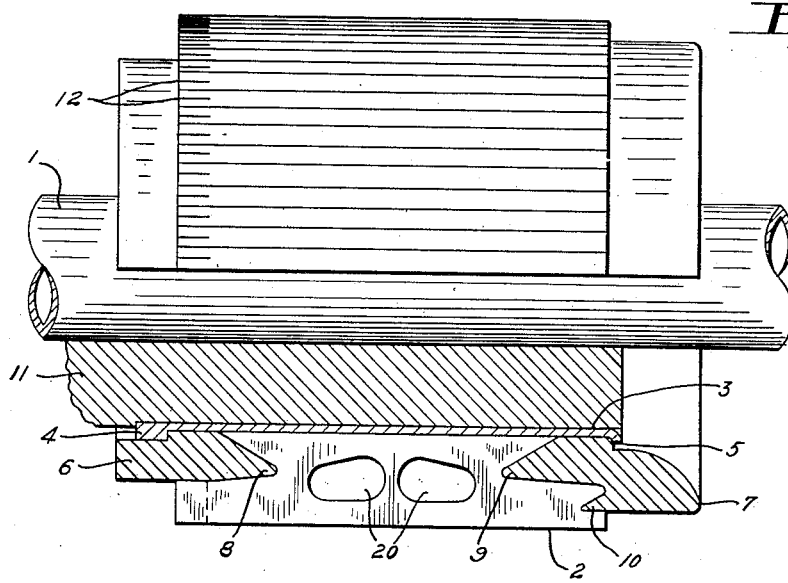
Figure 1 is a view of a commutator constructed according to the principles of the invention, the upper part of the view being in elevation, and the lower part being in section.

In Figure 1 the numeral 1 indicates a hollow armature shaft carrying a commutator, the armature core and windings being omitted for purposes of the present description. The commutator comprises a plurality of bars 2 arranged around a hollow rivet member 3 having a flange 4 on one end and a swaged or riveted end portion 5 on the other end. The flange 4 and riveted end 5 prevent axial separation of a pair of rings 6 and 7 which have tongues 8, 9 and 10 holding the bars 2 in place around the tubular rivet 3. The commutator assemblage just described may be mounted directly upon the shaft 1, or it may be carried by an intermediate member 11, as shown. Slots 12 are cut in the bars 2 for electrical connection with the armature conductors, and the usual insulation is provided to electrically isolate each bar from the others and from the rivet 3.

Figure 2:
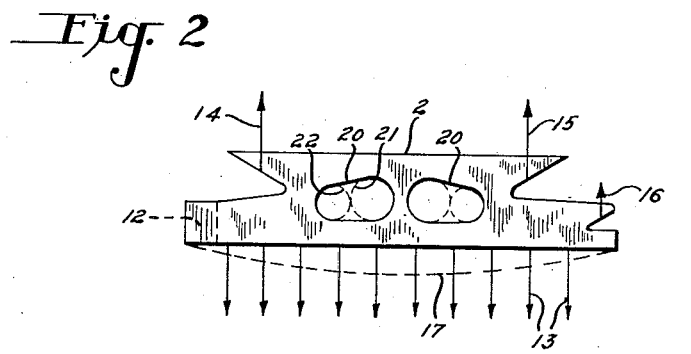
Figure 2 is an elevational view of an individual commutator bar shown in Figure 1, showing the forces acting thereon when the armature is rotating.

When the commutator is rotated at a high speed centrifugal force acting on the mass of each bar 2 produces a loading as shown by the force vectors 13, the bars being held in place by reaction forces exerted by tongues 8, 9 and 10, as indicated by vectors 14, 15 and 16, in Figure 2. Considered as a structural member, the bar 2 corresponds to an end supported beam under substantially uniform loading, and has a tendency to deform to the shape shown by the broken line 17, the amount of the deformation being exaggerated in the drawing to better illustrate the principle. When such a condition obtains, the commutator becomes barrel shaped, and, if the rotational speed is high enough, permanent deformation or disruption of the commutator may result.

Figure 3:
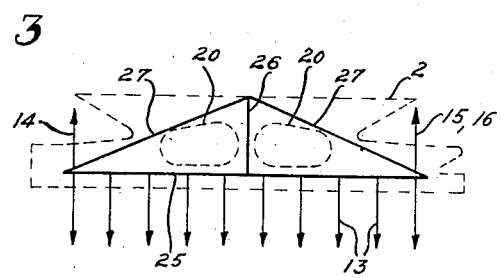
Figure 3 is a diagram showing how the present commutator bar has the characteristics of a conventional bridge truss.

According to the present invention the loading is reduced by reducing the mass of each bar 2, which has the effect of shortening the vectors 13. Reduction of the mass is accomplished by means of openings 20, each opening consisting of a large drill hole 21 and an intersecting smaller driller hole 22, additional material being removed to form a smooth outline for the combined opening 20, if desired. The spacing, size and orientation of the openings 20 is such as to leave the bar 2 roughly in the shape of a king post type of bridge truss as shown in Figure 3. Here it will be seen that the outer, or lower, edge of the bar 2 forms the horizontal member 25, of such a truss, the material between the openings 20 forming the upright or king post 26, and the end material forming the inclined members 27. The reaction supporting forces are here illustrated by the two vectors 14 and 15, 16. The material removed from the openings 20 will be seen to have contributed no substantial useful strength to the bar 2 although this material if present would add considerably to the mass and loading of the bar.

It will also be appreciated that the openings 20 might be still further enlarged to triangular shapes without impairing the strength or electrical conductivity of the bars, the present type of opening being preferred merely because it may be conveniently drilled as described. If the openings are cast in, or punched out, for example, somewhat more material may be removed, but the lightening effect obtained from the outline shown provides a marked improvement in high speed armature construction, reducing the amount of deformation at a given speed, or conversely, enabling higher rotational speeds. It is also to be remembered that the material removed not only makes a stronger commutator, but also reduces the over all dead weight of the machine, thereby in two ways increasing the output per pound, which is a critical consideration in aircraft accessories.

The preferred embodiment shown is to be regarded as illustrative only, and not in a limiting sense, the invention being limited only by the prior art and the scope of the appended claims.

I claim:

1. A commutator bar having a pair of openings therein to reduce the mass of said bar subject to centrifugal force, said openings being arranged to leave an integral configuration of material forming the tension and compression members of a king post bridge truss.

2. A commutator bar having a pair of lightening openings therein arranged on opposite sides of a solid central portion to leave an integral configuration of material comprising the horizontal, vertical and inclined members of a king post bridge truss whereby the loading under centrifugal force tending to produce deformation is reduced without materially affecting the strength to resist said deformation.

3. A commutator bar having a pair of spaced oval lightening openings therein, each of said openings comprising intersecting drill holes of different sizes, the material between said openings constituting a vertical member of a bridge truss and the material on the remaining sides of said openings constituting horizontal and inclined members of a bridge truss, to resist deformation of said bar when subjected to centrifugal force.

ARNOLD R. KEISTMAN